United States Patent
Wang et al.

(10) Patent No.: US 12,504,342 B2
(45) Date of Patent: Dec. 23, 2025

(54) SYSTEM FOR WHEEL ROTATIONAL INERTIA DETERMINATION

(71) Applicant: FCA US LLC, Auburn Hills, MI (US)

(72) Inventors: Chunjian Wang, Troy, MI (US); Alexander George, Whitmore Lake, MI (US)

(73) Assignee: FCA US LLC, Auburn Hills, MI (US)

( * ) Notice: Subject to any disclaimer, the term of this patent is extended or adjusted under 35 U.S.C. 154(b) by 400 days.

(21) Appl. No.: 18/326,044

(22) Filed: May 31, 2023

(65) Prior Publication Data
US 2024/0402028 A1     Dec. 5, 2024

(51) Int. Cl.
*G01M 1/10*     (2006.01)
*G01M 17/013*   (2006.01)

(52) U.S. Cl.
CPC ............ *G01M 1/10* (2013.01); *G01M 17/013* (2013.01)

(58) Field of Classification Search
CPC .............................. G01M 1/10; G01M 17/013
See application file for complete search history.

(56) References Cited

FOREIGN PATENT DOCUMENTS

WO     WO-2024050665 A1 *   3/2024  ................ B60L 7/18

* cited by examiner

*Primary Examiner* — Timothy P Graves
(74) *Attorney, Agent, or Firm* — Jeremy J. Klobucar

(57) ABSTRACT

In at least some implementations, a method of determining rotational inertia of a vehicle wheel is accomplished by applying torque to the wheel and determining a rotational characteristic of the wheel resulting from the applied torque. The method includes the steps of applying torque at a first level to a wheel, determining one or more rotational speeds of the wheel caused by the torque at the first level, applying torque at a second level to the wheel, where the second level is different than the first level, determining one or more rotational speeds of the wheel caused by the torque at the second level, and determining a rotational inertia of the wheel as a function of the one or more rotational speeds of the wheel caused by both the torque at the first level and the torque at the second level.

17 Claims, 3 Drawing Sheets

SYSTEM FOR WHEEL ROTATIONAL INERTIA DETERMINATION

FIELD

The present disclosure relates to a system for determining vehicle wheel inertia.

BACKGROUND

Electric vehicles include one or more motors that drive the vehicle wheels to propel the vehicle. The rotational inertia of the wheels affects the tire-ground friction calculation and changes to rotational inertia, such as can happen when different tires or rims/wheels are mounted to the vehicle, can change the weight and the rotational inertia of the wheel and affect vehicle performance.

SUMMARY

In at least some implementations, a method of determining rotational inertia of a vehicle wheel is accomplished by applying torque to the wheel and determining a rotational characteristic of the wheel resulting from the applied torque. The method includes the steps of applying torque at a first level to a wheel, determining one or more rotational speeds of the wheel caused by the torque at the first level, applying torque at a second level to the wheel, where the second level is different than the first level, determining one or more rotational speeds of the wheel caused by the torque at the second level, and determining a rotational inertia of the wheel as a function of the one or more rotational speeds of the wheel caused by both the torque at the first level and the torque at the second level.

In at least some implementations, the wheel is driven for rotation by an electric motor having a variable torque output. In at least some implementations, electrical power to the electric motor is controlled by a controller to cause the motor to provide the first level of torque and the second level of torque.

In at least some implementations, the rotational speed of the wheel is determined by a wheel speed sensor. In at least some implementations, the wheel speed sensor is coupled to a controller that receives information from the wheel speed sensor and that uses the information from the wheel speed sensor to determine the rotational inertia of the wheel.

In at least some implementations, the first torque level is at least 5% different than the second torque level.

In at least some implementations, more than one rotational speed is determined for the rotation caused by the torque at the first level with the rotational speeds being determined during acceleration of the wheel caused by the torque at the first level, and wherein an acceleration of the wheel caused by the torque at the first level is determined by a difference in the rotational speed of the wheel during acceleration of the wheel.

In at least some implementations, a first rotational speed is determined at a predetermined time after application of the torque at the first level and prior to the wheel reaching a maximum speed caused by the torque at the first level, and the rotational inertia of the wheel is determined as a function of the acceleration of the wheel caused by the torque at the first level. In at least some implementations, prior to application of the torque at the first level, the wheel has a rotational speed of zero, and wherein the acceleration of the wheel is determined as a function of the first rotational speed and the time at which the first rotational speed was determined.

In at least some implementations, the second level of torque is greater than the first level of torque and is applied after the wheel has reached a maximum rotational speed caused by the first level of torque.

In at least some implementations, prior to application of the torque at the second level, the wheel has a rotational speed of zero, and wherein the acceleration of the wheel is determined as a function of: a) a first rotational speed that is determined at a predetermined time after application of the torque at the second level and prior to the wheel reaching a maximum speed caused by the torque at the second level, and b) the time at which the first rotational speed was determined.

In at least some implementations, the wheel is rotating before application of at least one of the torque at the first level and the torque at the second level and said at least one of the torque at the first level and the torque at the second level is a negative torque that decreases the rotational speed of the wheel, and the rotational inertia of the wheel is determined as a function of the rate that the rotational speed of the wheel decreases.

In at least some implementations, a system for determining vehicle wheel rotational inertia includes a wheel mount, a motor, a wheel speed sensor and a controller. The motor is coupled to at least one of the wheel mount and the wheel to cause rotation of the wheel about an axis of rotation, where the motor is adapted to apply torque at different levels. The wheel speed sensor is associated with the wheel and has an output indicative of the rotational speed of the wheel. And the controller is coupled to the wheel speed sensor to receive the output from the wheel speed sensor, and the controller is coupled to the motor to drive the motor so that the motor provides torque to the wheel mount at the different levels of torque. The rotational inertia of the wheel is determined as a function of different rotational speeds of the wheel in response to different levels of torque provided by the motor.

In at least some implementations, the motor is an electric motor and the controller controls the supply of power from a power source to the motor to cause the motor to provide the torque at different levels. In at least some implementations, the motor is driven by a pulse width modulated signal. In at least some implementations, the motor is a brushless motor, and may be a servo motor or a stepper motor.

The rotational inertia of vehicle wheels can be used in, for example, a tire-ground friction calculation and to improve the accuracy of different vehicle control systems, like stability systems and anti-lock braking systems, and can be used to control the application of torque to the wheels by the vehicle motors.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
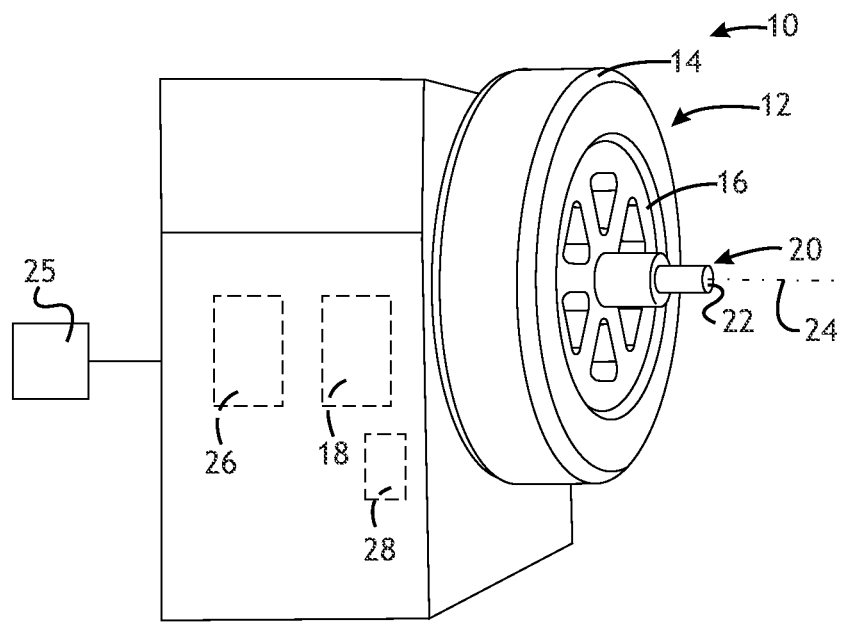
FIG. 1 is a perspective view of a wheel rotation assembly.
Figure 2:
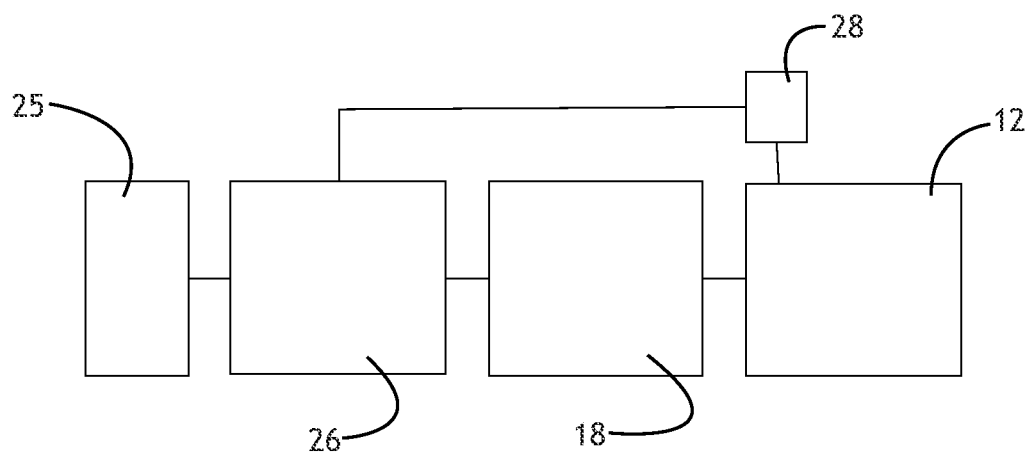
FIG. 2 is a block diagram of the wheel rotation assembly.

Referring in more detail to the drawings, FIGS. 1 and 2 illustrate a wheel rotation assembly 10 used to rotate a vehicle wheel 12 which may include the entire wheel assembly including a tire 14 and the structure 16 (rim/hub, sometimes called a wheel) to which the tire is mounted. The wheel rotation assembly includes a motor 18 that is coupled to a mount 20 to which a vehicle wheel 12 is connected so that the motor 18 can rotate one or both of the mount 20 and the wheel 12. The mount 20 may include a shaft or spindle 22 that is coupled to and driven by an output shaft of the motor 18, or the wheel 12 may be mounted to the output shaft directly and retained thereon by a bracket or collar. The wheel 12 is rotated by the motor 18 about an axis of rotation 24 defined by the output shaft and/or spindle 22, and as set forth herein, a rotational inertia of the wheel 12 may be determined by detecting wheel rotation associated with controlled rotation of the wheel 12.

The motor 18 is an electric motor that has a torque output that can be varied, such as by changing the magnitude of electrical power (e.g. current) supplied to the motor 18. In this way, the motor 18 can be controlled to drive the wheel 12 at multiple different torque levels. The motor 18 may be of any suitable type, including an AC or DC motor, the motor 18 may be reversible and capable of driving the wheel 12 in either rotational direction. The motor 18 may be driven at different power levels (e.g. different current levels) and/or by a pulse width modulated signal to enable a mechanical power output from the motor 18 at different torque levels. The torque applied by the motor 18 can be measured by a sensor (e.g. torque sensor) or it can be determined as a function of the electrical power provided to the motor 18, for example, the magnitude of current (with a voltage assumed or also included in the calculation), or the duty cycle of a pulse width modulated signal. The output of the motor 18 for a given electrical input to the motor 18 would be predetermined and, for example, stored in a lookup table or data map.

Electrical power may be provided to the motor 18 from a power source 25, and application of electrical power may be controlled by a controller 26 that is coupled to the motor 18. The controller 26 may be arranged to vary the electrical power provided to the motor 18 to cause the motor 18 to drive the wheel 12 at different magnitudes of torque. In at least some implementations, the controller 26 provides a pulse width modulated signal at varying duty cycles to the motor 18 to vary the output of the motor 18 in a controlled and known manner.

In order to perform the functions and desired processing set forth herein, as well as the computations therefore, the controller 26 or control system may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 26/control system may include input signal processing and filtering to enable accurate sampling and conversion or acquisitions of such signals from communications interfaces and sensors.

As used herein the terms control system or controller 26 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality.

Application of torque from the motor 18 to the wheel 12 causes the wheel 12 to rotate about the axis of rotation 24. To permit measurement of the wheel rotation, a wheel speed sensor 28 may be associated with the wheel 12 to provide an output to the controller 26 that is indicative of the rotation of the wheel 12. The wheel speed sensor 28 may measure rotational speed, acceleration, or both. Further, acceleration may be determined by the derivative of rotary speed output(s) from the sensor. By way of a non-limiting example, the wheel speed sensor 28 may be a hall effect sensor with a magnet being rotated with the wheel 12 or spindle and with a sensing element used to detect the magnet as it rotates by the sensing element. Of course, other types of rotational speed sensors may be used. For example, the speed could be based upon motor speed or an estimation of motor speed which may be part of a motor control program.

To determine the rotational inertia of a wheel 12, the wheel 12 is mounted to the wheel rotation assembly 10 so that the wheel 12 may be rotated by the motor 18. The rotational inertia of the wheel 12 can be determined based upon the torque used to rotate the wheel 12 and the rotational speed/acceleration of the wheel 12 as a result of the applied torque. To improve the accuracy of the rotational inertia determination, the wheel 12 may be driven by different torques and/or the rotation and calculation can be performed multiple times with a filter applied to normalize or average the results.

Figure 3:
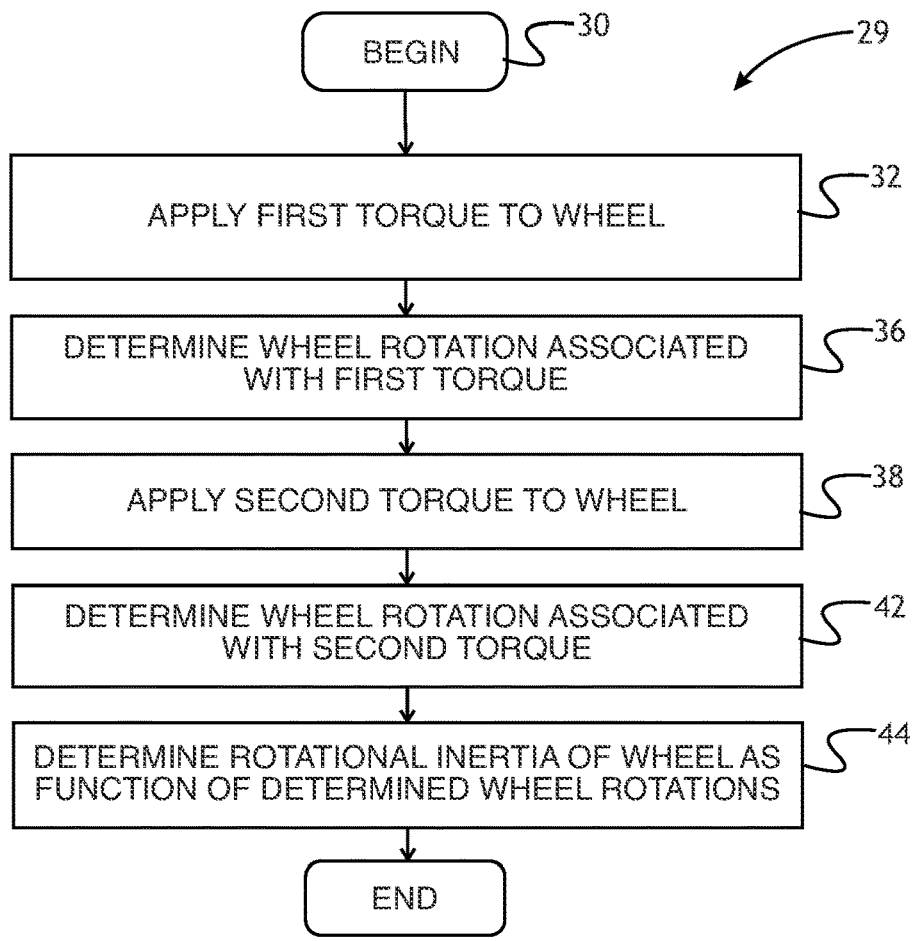
FIG. 3 is a flow chart of a method of determining rotational inertia of a wheel.
Figure 5:
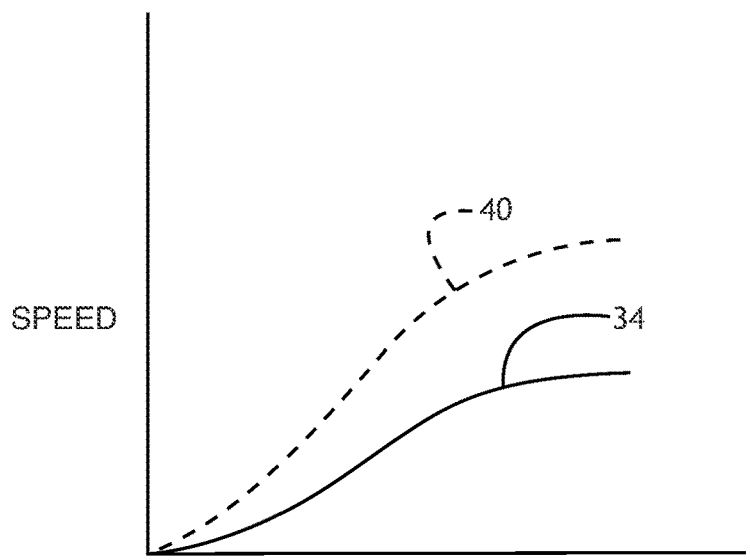
FIG. 5 is a graph of speed vs. time showing acceleration of a wheel at different input torque levels.

FIG. 3 illustrates one method 29 that may be used to determine rotational inertia of a wheel 12. The method may begin at 30 and in step 32, torque is applied to the wheel 12, where the torque is at a first level or magnitude. The wheel 12 may be stationary or rotating when the torque at the first level is applied, as desired. Rotation of the wheel 12 as a result of the applied torque is shown in FIG. 5 by line 34. After the torque is applied, the rotation of the wheel 12 associated with or caused by the first torque level is determined in step 36. In this step, the acceleration of the wheel 12 may be determined, and that may be done after initial application of the torque and before the wheel 12 reaches a maximum rotary speed caused by the first torque. That is, the associated wheel rotation may be determined while the wheel 12 is accelerating from an initial speed toward a final speed, where the initial speed may be zero in at least some implementations.

In at least some implementations, the method will continue to step 38 in which torque at a second level is applied to the wheel 12. The second torque level is different from the first torque level. In the example of FIG. 5, the second level of torque is greater than the first level, and the resulting wheel rotation is shown by line 40. In at least some implementations, the first torque level is at least 5% different than the second torque level. Next, in step 42, the rotation of the wheel 12 associated with or caused by the second level of torque is determined. Thereafter, in step 44, the rotational inertia of the wheel 12 is determined. The rotational inertia is determined as a function of the wheel rotation change caused by the applied torques (e.g. change in rotary speed).

Figure 4:
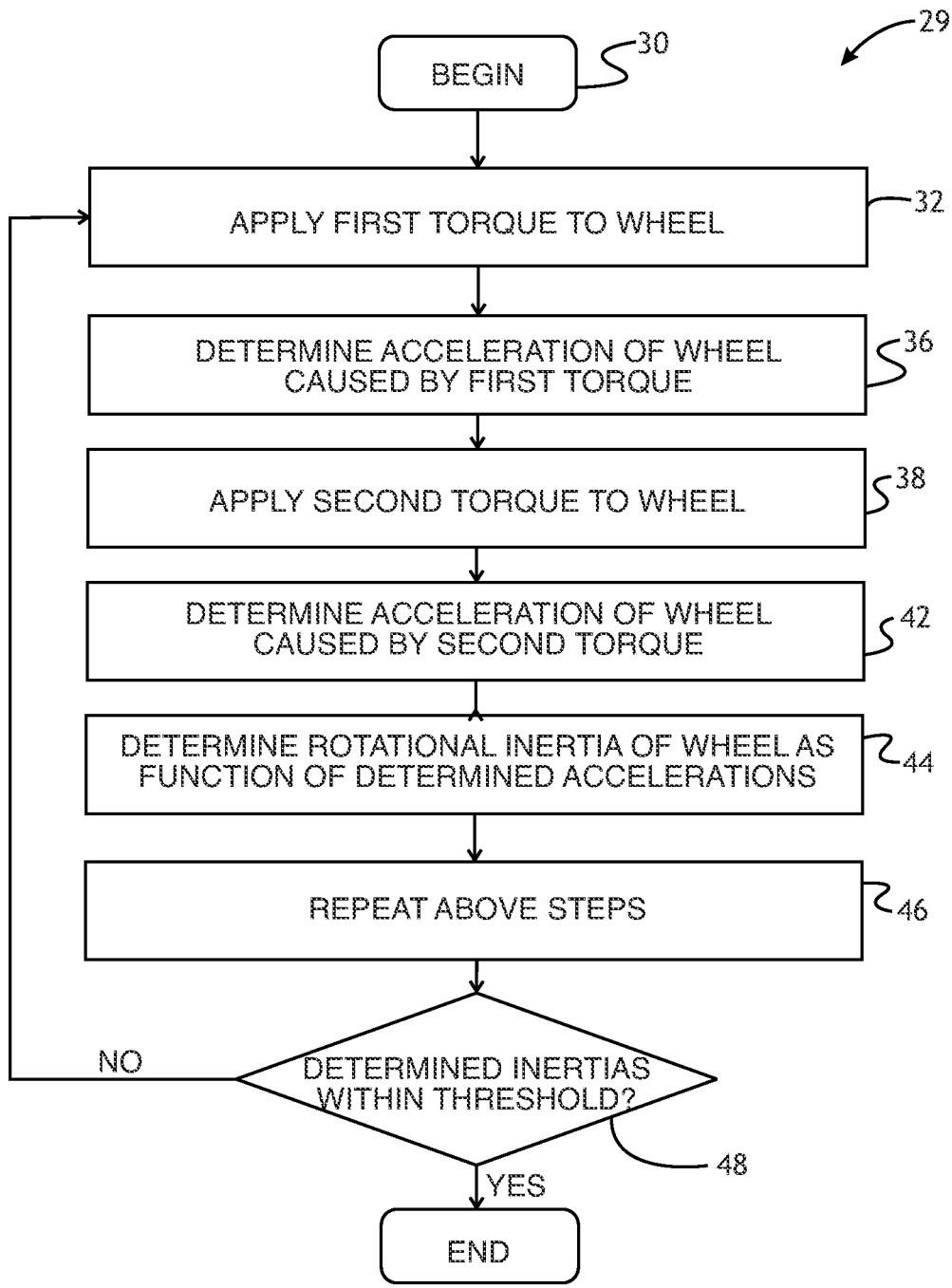
FIG. 4 is a flow chart of a method of determining rotational inertia of a wheel.

The method may be varied, as desired. For example, while two different levels of torque are described in the above method, more than two levels of torque may be applied and associated wheel rotation determined for each torque level. The wheel 12 may be stopped after each level of torque is applied and before a different level of torque is applied, or the wheel rotation may continue with varied torque levels applied, both positive and negative (where negative torque would reduce rotational speed of the wheel 12) and a change in wheel rotation determined after application of the different levels of torque. As shown in FIG. 4, the method 29 may be run twice, per step 46, and the determined rotational inertia values compared. Then, in step 48, if the results are not within a predetermined threshold, the method may be run again to ensure that a reliable and accurate result is obtained. This comparison and result difference threshold check may be done with any number of torque applications at any number of torque levels, as desired.

Further, the wheel rotation can be measured or determined in different ways. For example, if time zero is when the torque is initially applied, the wheel rotary speed can be determined at a predetermined period after time zero, with the acceleration between time zero and time one being determined as a function of the wheel speed at time one and the amount of time between time zero and time one The wheel rotation can be determined as a function of the change in wheel rotary speed between two times during acceleration caused by application of a torque, or the wheel acceleration may be determined, such as by an accelerometer which directly measures acceleration at a desired time or times. While one or two times are noted at which wheel speed or acceleration may be determined, a method may use more than two times, as desired. In at least some implementations, the wheel rotation determinations occur as the wheel 12 is accelerating (increasing or decreasing rotary speed) and before the wheel 12 reaches a final or maximum speed at a given motor 18 torque value.

In at least some implementations, the collected data may include the torque, a wheel speed and a wheel acceleration (derivative of speed) for n intervals. That is, $(T_1, \omega_1, \dot{\omega}_1)$, $(T_2, \omega_2, \dot{\omega}_2) \ldots (T_n, \omega_n, \dot{\omega}_n)$. And the relationship between applied torque and wheel speed/acceleration may be characterized as: $T-[a\omega^2+b\omega+c]=I_{tire}\dot{\omega}$, and the least squares method may be used to determine the coefficients a, b, c and the inertia $I_{tire}$.

While shown in FIG. 1 as being performed on a wheel 12 that is separate from a vehicle, the method may be performed on a wheel mounted to the vehicle, while the vehicle is lifted off the ground so the wheels 12 may spin without contacting the ground. In this case, a vehicle motor 18 would rotate a shaft and other components associated with the wheel 12 when performing the method. The components also rotated can have known rotational inertia that may be removed from the determination, or the rotational inertia for the subassembly including the components and the wheel 12 can be determined by the method. For a situation where a single motor drives more than one wheel, the rotational inertia of any one wheel might not be determined by the overall rotational inertia of the wheels and rotating components might be determined.

With the wheel rotation system, the rotational inertia of a wheel 12 can be determined. The rotational inertia or moment of inertia of a wheel 12 can be used in a vehicle control system used to drive the vehicle wheels 12 via a powertrain, such as one that includes multiple electric motors. Some vehicles include individual wheel motors with each motor 18 controlled to provide a desired propulsion of its associated wheel 12. In such multi-motor 18 electric vehicles where torque vectoring functionality is provided, the estimation of tire-ground friction force can improve the control accuracy and response speed of torque vectoring. To estimate tire-ground friction force, the rotational inertia of a wheel 12 must be known or estimated. By the systems and method described herein, rotational inertia of a vehicle's wheels 12 can be determined, and this information can be used in an estimation of tire-ground friction. The tire-ground friction determination can be done by any suitable model or algorithm, such as one that is based on a bicycle model. Such determinations can be used to improve the function of, for example, vehicle stability controls and anti-lock braking systems.

While the rotational inertia of a wheel 12 can be known when the tires are new, the rotational inertia can change over time, and when new tires/wheels 12 are mounted on the vehicle. For example, a significant change in rotational inertia may occur if a much larger or smaller wheel 12 is fitted to the vehicle, and the change in tire-ground friction can be an issue if the motors are driving wheels 12 as if the wheels 12 had the previously determined rotational inertia.

What is claimed is:

1. A method of determining rotational inertia of a vehicle wheel, comprising:
   applying torque at a first level to a wheel;
   determining one or more rotational speeds of the wheel caused by the torque at the first level;
   applying torque at a second level to the wheel, where the second level is different than the first level;
   determining one or more rotational speeds of the wheel caused by the torque at the second level; and
   determining a rotational inertia of the wheel as a function of the one or more rotational speeds of the wheel caused by both the torque at the first level and the torque at the second level.

2. The method of claim 1 wherein the wheel is driven for rotation by an electric motor having a variable torque output.

3. The method of claim 2 wherein electrical power to the electric motor is controlled by a controller to cause the motor to provide the first level of torque and the second level of torque.

4. The method of claim 1 wherein the rotational speed of the wheel is determined by a wheel speed sensor.

5. The method of claim 4 wherein the wheel speed sensor is coupled to a controller that receives information from the wheel speed sensor and that uses the information from the wheel speed sensor to determine the rotational inertia of the wheel.

6. The method of claim 1 wherein the first torque level is at least 5% different than the second torque level.

7. The method of claim 1 wherein more than one rotational speed is determined for the rotation caused by the torque at the first level with the rotational speeds being determined during acceleration of the wheel caused by the torque at the first level, and wherein an acceleration of the wheel caused by the torque at the first level is determined by a difference in the rotational speed of the wheel during acceleration of the wheel.

8. The method of claim 1 wherein a first rotational speed is determined at a predetermined time after application of the torque at the first level and prior to the wheel reaching a maximum speed caused by the torque at the first level, and the rotational inertia of the wheel is determined as a function of the acceleration of the wheel caused by the torque at the first level.

9. The method of claim 8 wherein, prior to application of the torque at the first level, the wheel has a rotational speed of zero, and wherein the acceleration of the wheel is determined as a function of the first rotational speed and the time at which the first rotational speed was determined.

10. The method of claim 1 wherein the second level of torque is greater than the first level of torque and is applied after the wheel has reached a maximum rotational speed caused by the first level of torque.

11. The method of claim 1 wherein, prior to application of the torque at the second level, the wheel has a rotational speed of zero, and wherein the acceleration of the wheel is determined as a function of: a) a first rotational speed that is determined at a predetermined time after application of the torque at the second level and prior to the wheel reaching a maximum speed caused by the torque at the second level, and b) the time at which the first rotational speed was determined.

12. The method of claim 1 wherein the wheel is rotating before application of at least one of the torque at the first level and the torque at the second level and said at least one of the torque at the first level and the torque at the second level is a negative torque that decreases the rotational speed of the wheel, and the rotational inertia of the wheel is determined as a function of the rate that the rotational speed of the wheel decreases.

13. A system for determining vehicle wheel rotational inertia, comprising:
a wheel mount;
a motor coupled to at least one of the wheel mount and the wheel to cause rotation of the wheel about an axis of rotation, where the motor is adapted to apply torque at different levels;
a wheel speed sensor associated with the wheel and having an output indicative of the rotational speed of the wheel; and
a controller coupled to the wheel speed sensor to receive the output from the wheel speed sensor, and the controller is coupled to the motor to drive the motor so that the motor provides torque to the wheel mount at the different levels of torque, wherein the rotational inertia of the wheel is determined as a function of different rotational speeds of the wheel in response to different levels of torque provided by the motor.

14. The system of claim 13 wherein the motor is an electric motor and the controller controls the supply of power from a power source to the motor to cause the motor to provide the torque at different levels.

15. The system of claim 14 wherein the motor is driven by a pulse width modulated signal.

16. The system of claim 14 wherein the motor is a brushless motor.

17. The system of claim 14 wherein the motor is a servo motor or a stepper motor.

* * * * *